April 24, 1951 R. P. MURPHY 2,550,585

TELEPHONE IDENTIFICATION CIRCUIT

Filed April 26, 1949 6 Sheets-Sheet 1

INVENTOR
R. P. MURPHY
BY [signature]
ATTORNEY

April 24, 1951 R. P. MURPHY 2,550,585

TELEPHONE IDENTIFICATION CIRCUIT

Filed April 26, 1949 6 Sheets-Sheet 2

INVENTOR
R. P. MURPHY
BY
ATTORNEY

April 24, 1951 R. P. MURPHY 2,550,585

TELEPHONE IDENTIFICATION CIRCUIT

Filed April 26, 1949 6 Sheets-Sheet 3

INVENTOR
R. P. MURPHY
BY [signature]
ATTORNEY

April 24, 1951 R. P. MURPHY 2,550,585

TELEPHONE IDENTIFICATION CIRCUIT

Filed April 26, 1949 6 Sheets-Sheet 4

INVENTOR
R. P. MURPHY
BY [signature]
ATTORNEY

April 24, 1951 R. P. MURPHY 2,550,585

TELEPHONE IDENTIFICATION CIRCUIT

Filed April 26, 1949 6 Sheets-Sheet 5

INVENTOR
R. P. MURPHY
BY
[signature]
ATTORNEY

TELEPHONE IDENTIFICATION CIRCUIT

Filed April 26, 1949 6 Sheets-Sheet 6

INVENTOR
R. P. MURPHY
BY [signature]
ATTORNEY

Patented Apr. 24, 1951 2,550,585

UNITED STATES PATENT OFFICE 2,550,585

TELEPHONE IDENTIFICATION CIRCUIT

Richard P. Murphy, Nyack, N. Y., assignor to Bell Telephone Laboratories, Incorporated, New York, N. Y., a corporation of New York Application April 26, 1949, Serial No. 89,750

23 Claims. (Cl. 179—7.1)

This invention relates to station indicating devices in a telephone system, and particularly to devices for determining the directory number of telephone stations and other specific information individual to the station which may be useful in the billing of connections or for other purposes.

Identification of a telephone station by its directory number presents difficulties in telephone systems where no direct relation exists between the terminal number or physical location of the line to which the station is connected and the directory number assigned to the station. The problem is further complicated in cases where, as in party lines for example, a plurality of stations are connected to one line, each having an individual directory number with a common line terminal for all stations.

The present invention discloses an economical and simple system for obtaining the directory number of a calling station directly and rapidly. While particularly valuable for use with crossbar telephone systems, it is not limited in its application to systems of this type nor to the purpose of automatic message accounting, but is applicable to any type of telephone system and to any purpose for which it is desirable to ascertain the directory number of a calling station.

A feature of the invention is a novel electronic network and associated apparatus which, in response to the extension of a connection from a calling station, operates to determine the directory number of the station, and to control suitable recording equipment by which said number is recorded either on the decimal basis or a suitable permutation code.

Still another feature of the invention is the use of an electronic device for each station on a line having a plurality of stations, in which the device for each station is provided with an electrode for each digit of the directory number of that station as well as for each digit of any other number whose identity is to be determined for the station, and in which upon the extension of the line when a station thereon calls, the electronic devices for all stations on the line are activated by an impulse transmitted over the connection, but only the device individual to the calling station is retained in a state of conductivity upon the termination of the pulse, to actuate over its electrodes suitable registering, encoding and recording apparatus.

Still another feature of the invention is an electrical checking network the operation of which insures against irregularities of circuit or apparatus performance such as, for example, the false operation or non-operation of certain electronic devices.

Yet another feature of the invention is a novel arrangement of electronic devices for P. B. X line groups in which the extension of a connection from any line in the group will activate the electronic device of the line to which the connection is to be charged and whose directory number is the one to be identified and recorded.

These and other features of the invention will be apparent from the following description, the appended claims and drawings in which:

Fig. 1 shows a subscriber's line with four party stations thereon, together with the electronic devices for each station, conventional means for extending a connection and certain equipment common to all stations in the office;

Fig. 1A shows the circuit arrangement for the lines of a P. B. X groups;

I will first describe briefly the various portions of the entire disclosure, together with their purposes, and will then describe in detail their significance with each other in connection with a detailed description of the operation of the invention.

Figures 1, 1A, 8:
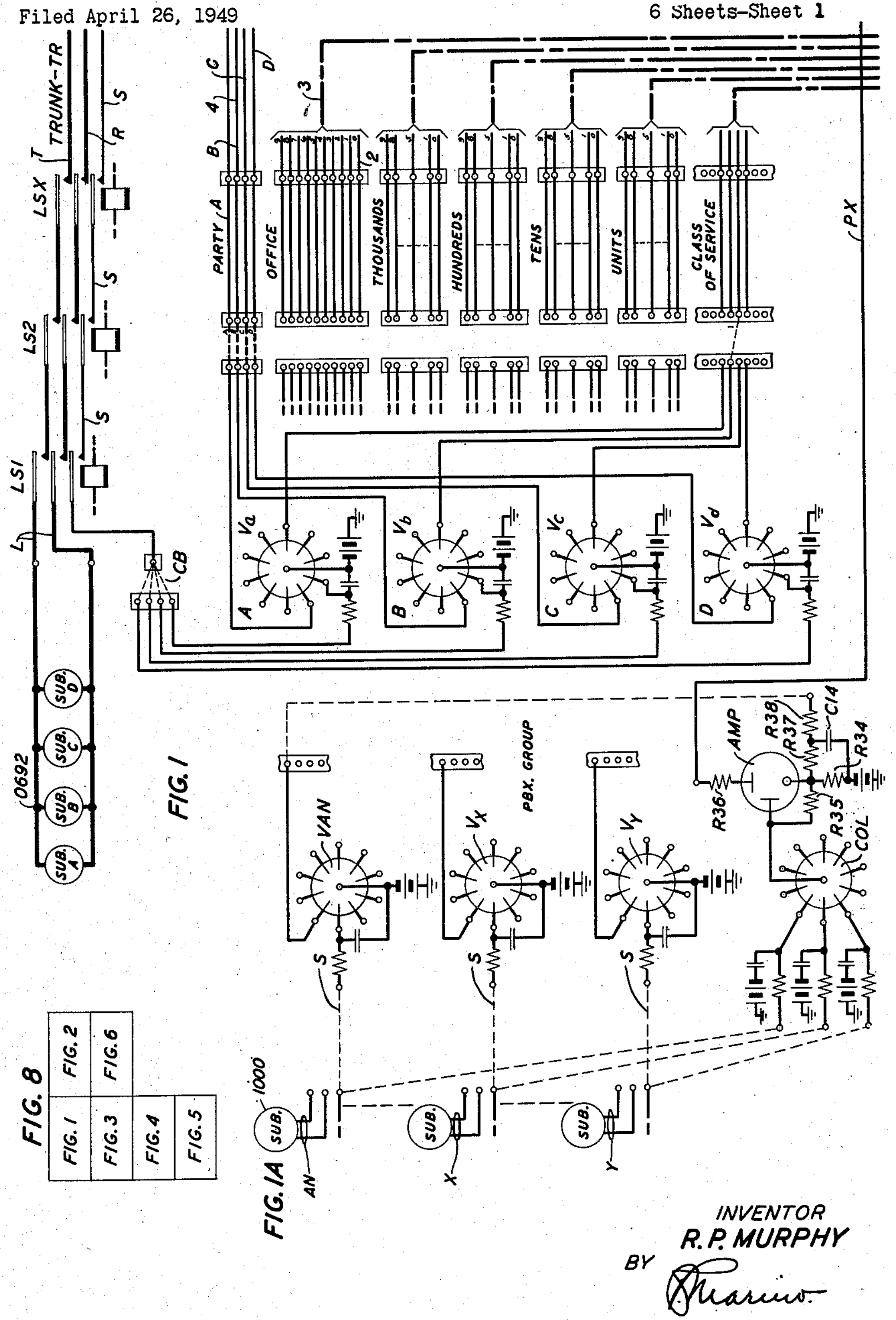
Fig. 8 shows how the above figures (excepting Figs. 1A and 7) should be placed with relation to one another to disclose the invention.

Fig. 1 shows a telephone line L having four telephone stations A, B, C and D thereon, and the usual switching train by which, when a station originates a call, the line is extended to a trunk TR over a number of switching stages LS1, LS2 . . . . LSX. Each station is provided with an electronic device V*a*, V*b*, V*c*, and V*d*, each device having a number of electrodes of which one is connected to conductor S of the line by way of the connecting blocks CB, one is selectively cross-connected to a bus bar in the Party group of bus bars in accordance with the identity of the station, certain other electrodes are selectively connected by fixed wiring in accordance with the directory number of the station to the bus-bar groups Thousands, Hundreds, Tens and Units, another electrode is connected to the Office group of bus bars in accordance with a digit indicating the exchange in which the station is located, while still another electrode is cross-connected to a bus bar in the Class of Service group in accordance with the class of telephone service to which the station is entitled. All of these bus-bar groups are shown below the switch train in Fig. 1, and it is understood that all other stations in the office except as hereinafter noted have the electrodes of their respective electronic devices similarly connected to the bus bars shown in Fig. 1.

Figure 3:
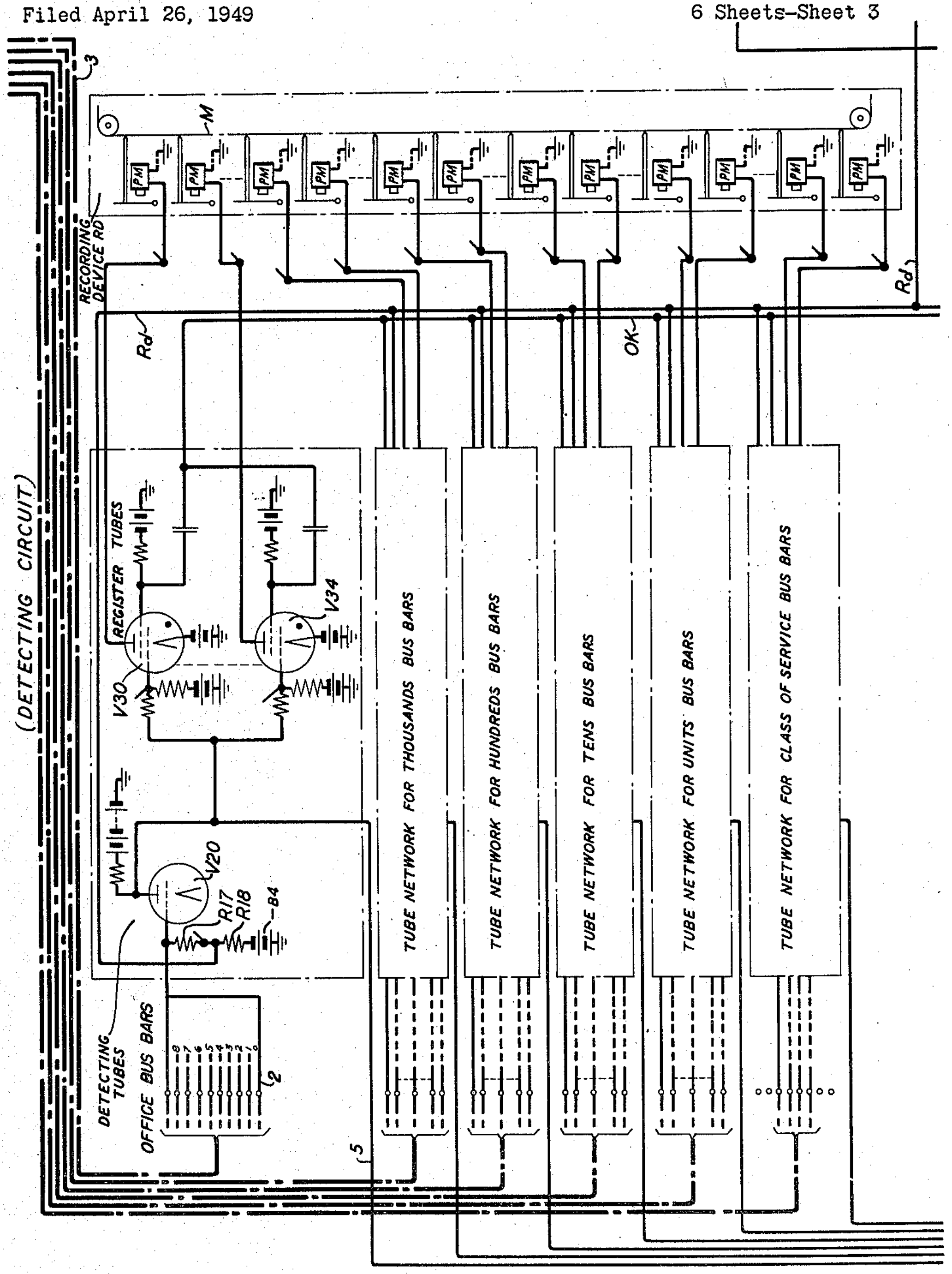
Fig. 3 shows the electronic network of the detecting circuit and a recording device.

Each bus bar is, in turn, connected to a detecting tube, such as, for example, tube V20 in Fig. 3, whose grid is connected to the 0 bus bar of the Office group, similar tubes (not shown) being provided for each of the other bus bars except those in the Party group. Each detecting tube V20 is then connected to a pair of screen grid thyratron register tubes through an encoding network such as, for example, V30 and V34 of the group of five tubes V30 . . . . V34 and all of said registering tubes have their anodes severally connected according to a predetermined code to the magnets PM of a recording device RD.

Figure 4:
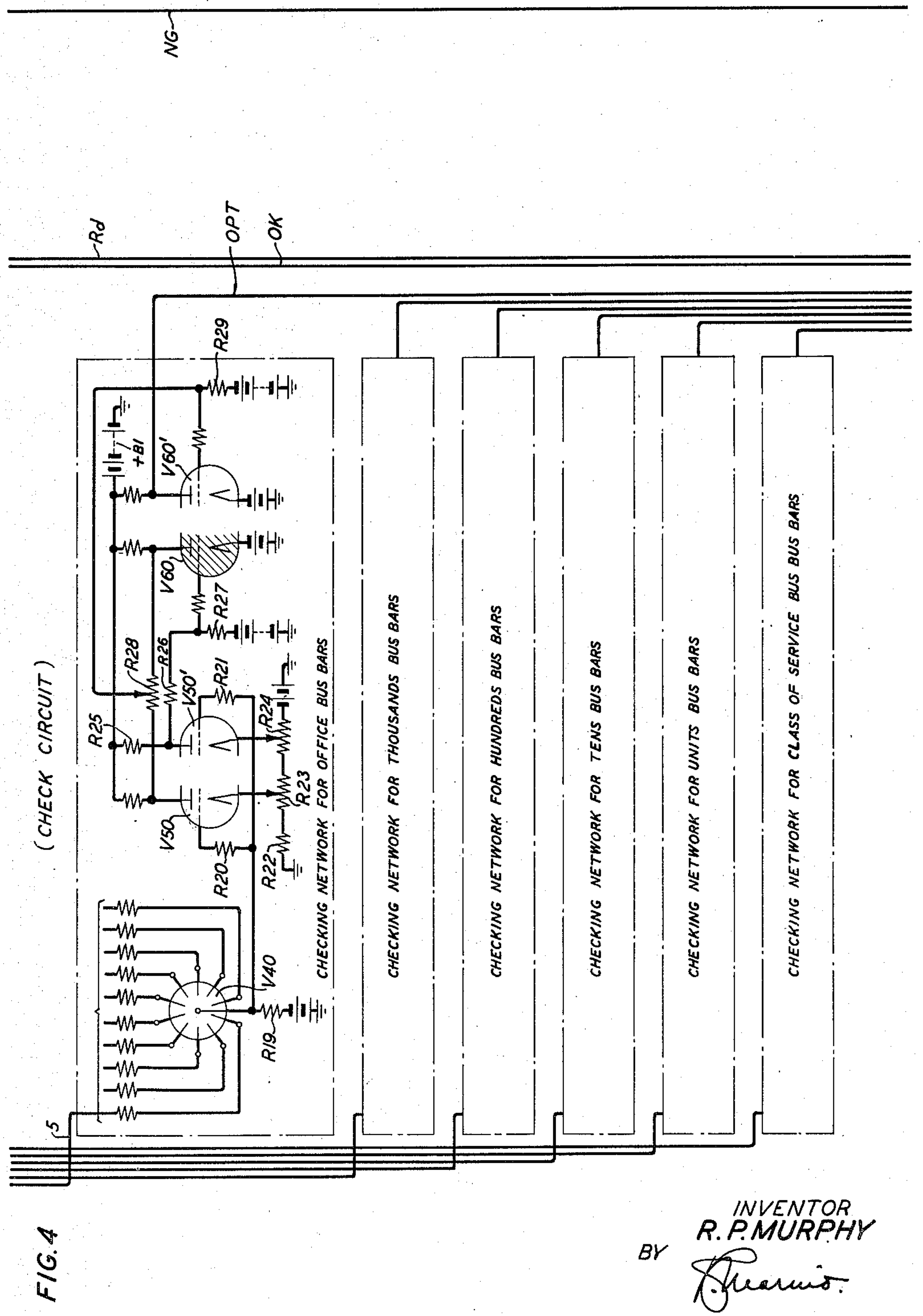
Figs. 4 and 5 show the check circuit.
Figure 5:
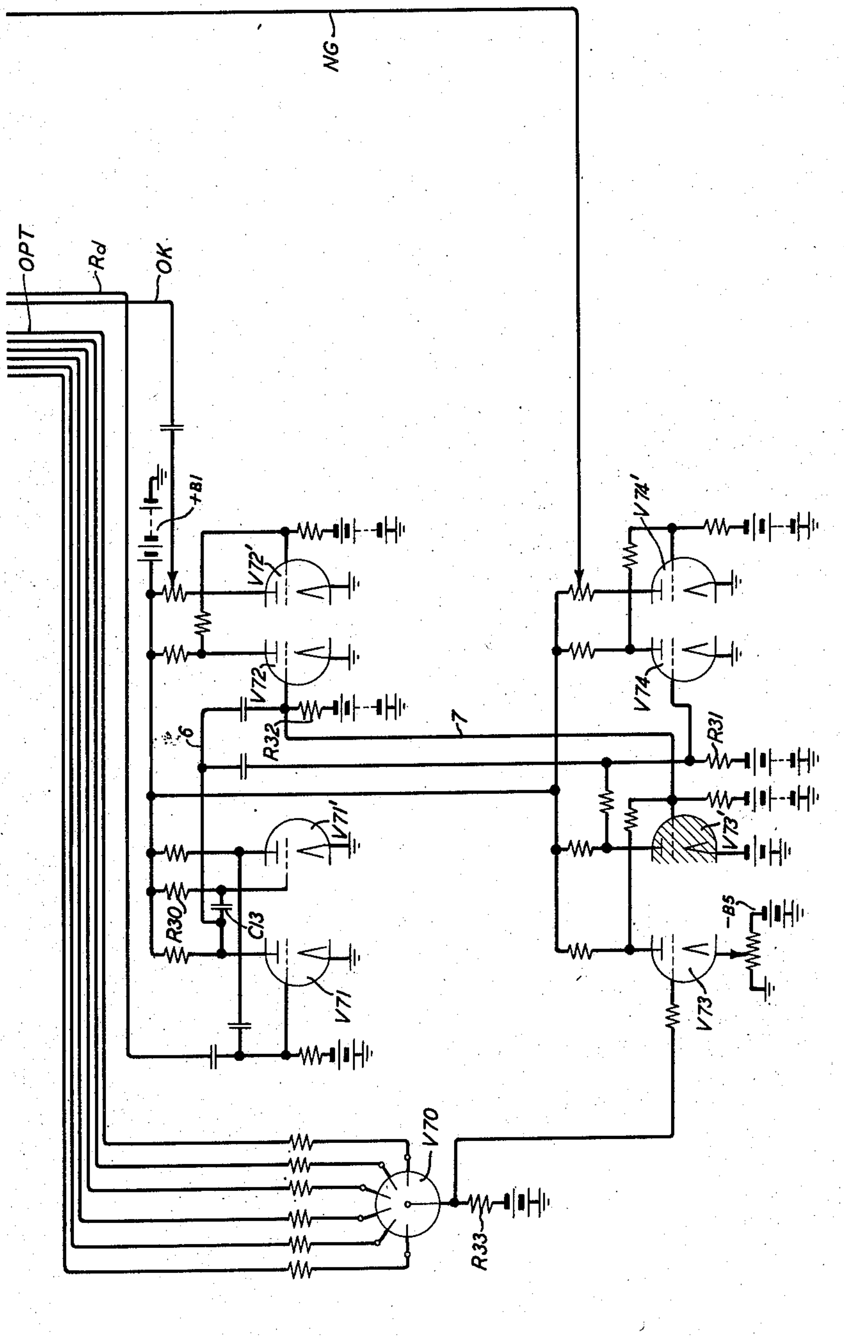

Figs. 4 and 5 together, constitute a "check" circuit by the operation of which it is determined whether or not the proper number of tubes V20 are operated at each identifying operation. If the proper number of tubes has been operated, an impulse is applied to conductor OK which has the effect of operating certain pairs of register tubes V30 . . . . V34 and the perforating magnets PM severally associated therewith, whereas, if an improper number of tubes has been operated, an impulse is applied to conductor NG which causes the circuits of the system to perform another identifying operation.

Figures 6, 7:
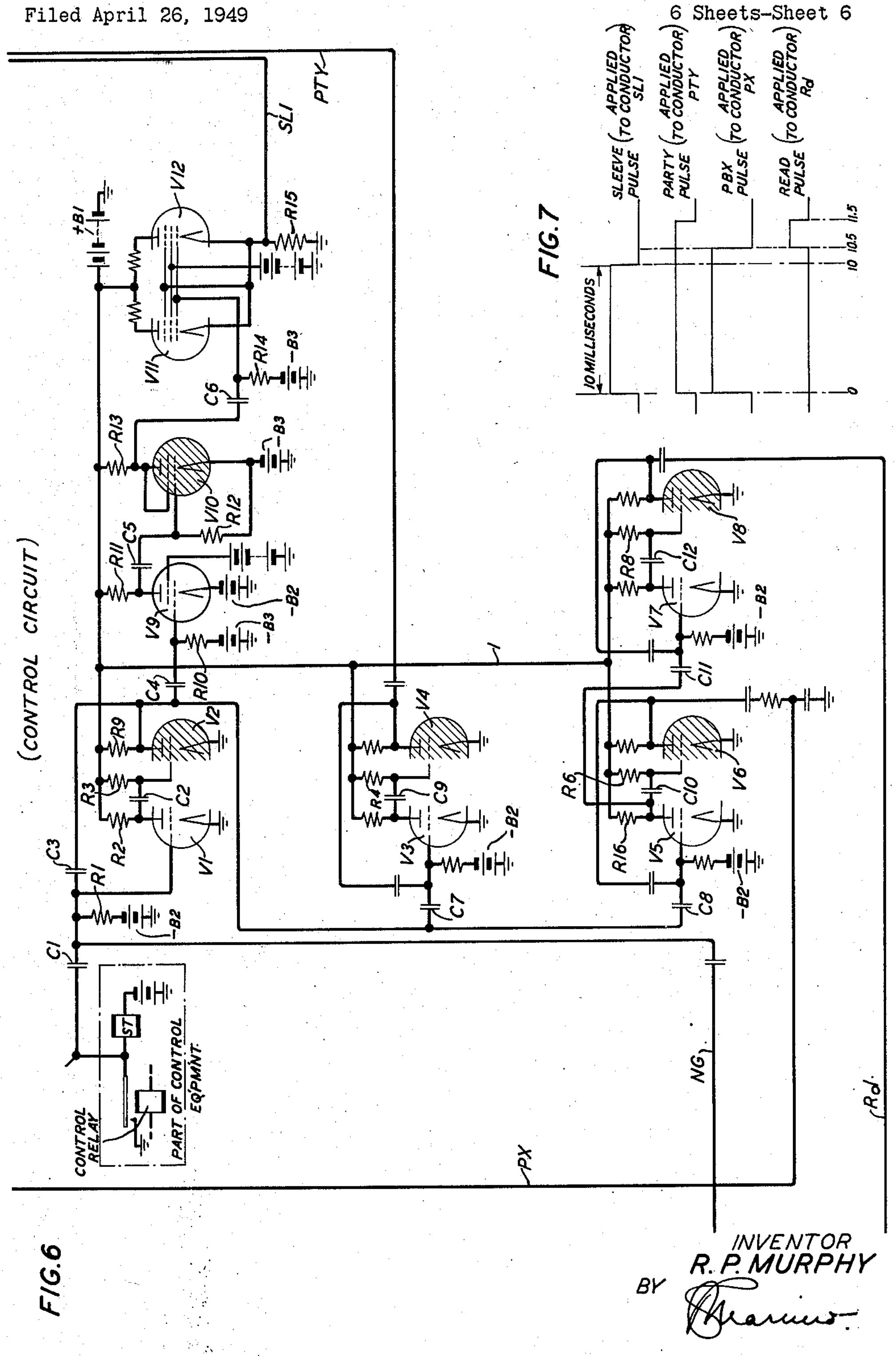
Fig. 6 shows the control circuit.
Fig. 7 shows a time chart of the duration of the various pulses utilized in the operation of the invention.

Fig. 6 shows the control circuit by means of which the pulses, and the durations thereof as graphically indicated in Fig. 7, are generated and applied to conductors SL1, PX, Rd and PTY for the purposes hereinafter set forth.

Briefly the general principle of the operation of the invention is as follows: When a station iniates a call and the connection is extended to the trunk TR, a station identification circuit SI associated with the trunk determines the identity of the calling station and causes that identity to be registered in the station register by the operation and locking of a relay theren which indicates the station. When, thereafter, it is desired to determine the directory number of the calling station, the control circuit is activated to produce three pulses simultaneously, of which one is applied over conductor SL1 and, thereover, to conductor S of the connection to activate the four station tubes V*a*, V*b*, Vc and V*d*. Another pulse of slightly longer duration and lower amplitude is simultaneously applied over conductor PTY and, through the operated relay of the station register in the trunk, to the bus bar in the Party group which is individual to the station and to which an electrode of the tube associated with the station making the call is cross-connected. When the pulse on conductor S terminates, the pulse on conductor PTY persists, but because the pulse on conductor PTY is extended to the tube of the calling station over a bus bar in the Party group while that on conductor S is extended to all the tubes associated with the line of the calling station, it follows that when the pulse on the latter conductor terminates, three of the tubes will be extinguished, the tube remaining activated being that of the calling station, which tube, as said before, is held activated by the longer pulse over conductor PTY.

The tube of the calling station, remaining activated, renders conductive the bus bars to which its electrodes are severally connected, and since all the bus bars are extended to corresponding detecting tubes V20, the circuit arrangement is such that those tubes V20 which are connected to the inactivated bus bars in each group will be rendered conducting while the tube in each group of bus bars which is connected to the activated bus bar therein will remain non-conducting. As will be shown, each non-conducting tube V20 in group then enables its associated pair of tubes V30 . . . . V34 which, however, being screen grid tubes are not operated at this time. In the meanwhile, the operation of all detecting tubes V20 except the one in each group connected to a conducting bus bar is checked by the check circuit of Figs. 4 and 5, and if there is one (and only one) non-operated detecting tube V20 in each group, a pulse is applied over conductor OK which, being connected to the screens of the pairs of tubes V30 and V30′ renders conductive those pairs which were previously enabled by the non-operated tubes V20. The operation of the pairs of tubes V30 . . . . V34 then actuates the perforator magnets PM to record the detected information; that is, the directory number, office and class of service of the calling station.

I will now describe the detailed operation of the invention.

It will be assumed that a call is initiated at one of the party stations, say party station B, which is further assumed to have the directory number 0692 and that, as a result, the line L of which station B is a part is extended in the well-known manner through line extending switch stages LS1, LS2 . . . LSX to the trunk TR. The conductors T, R and S of the trunk TR terminate on the terminals of the moving element of a panel or step-by-step switch, or one of the coordinate elements of a cross-bar switch or any other suitable type of switching apparatus. Through such element, the trunk TR may then be selectively extended by suitable control apparatus well known in the art to the wanted office or to some intermediate switching center through which the wanted office may be reached. Since the invention is not concerned with operations, or equipment, involved in the extension of the connection beyond the trunk, or even to the trunk except in so far as the conductors T, R and S thereof are utilized for the purpose of this invention, the apparatus or control equipment by which the connection is extended to a distant office is neither shown nor described.

Figure 2:
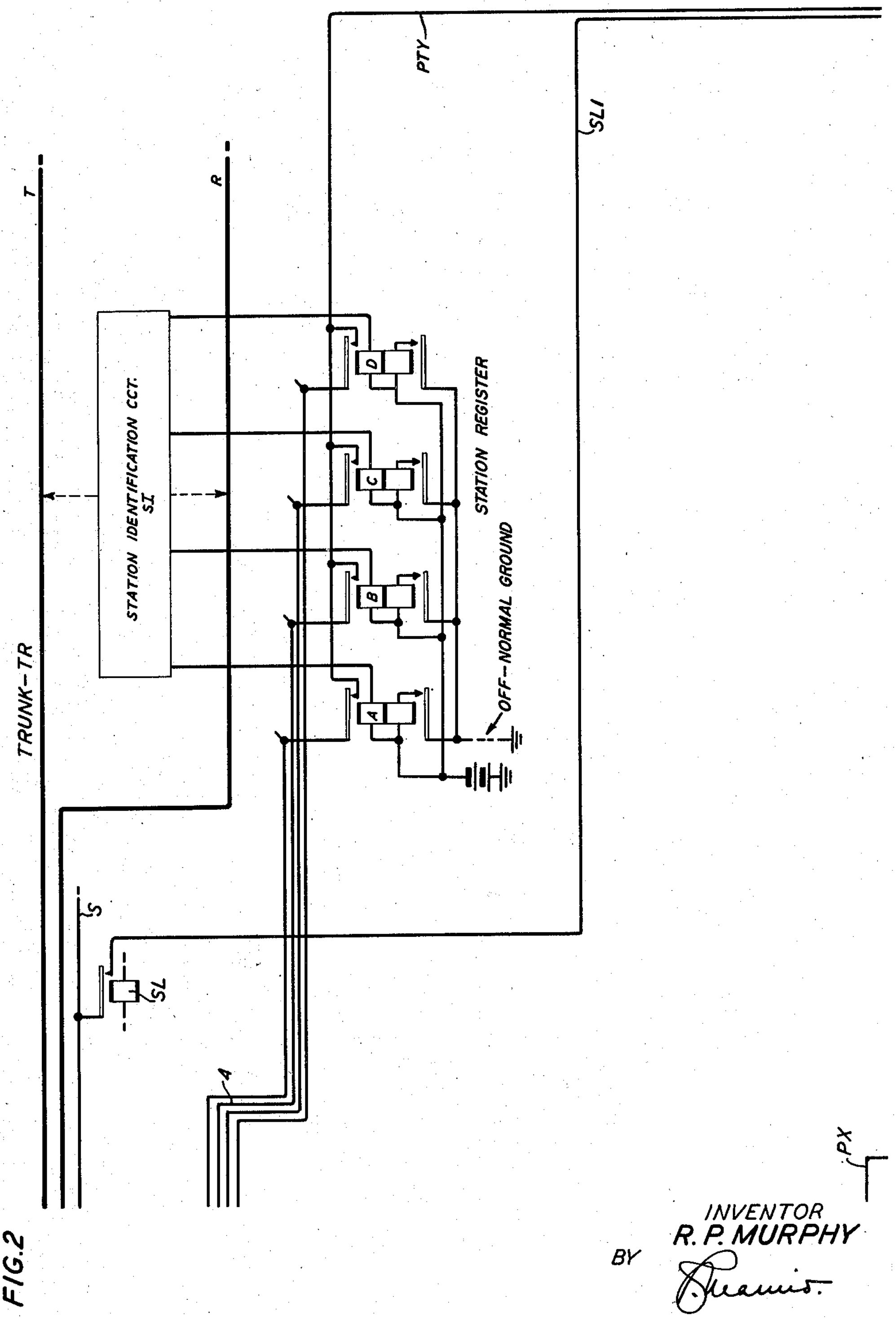
Fig. 2 shows the trunk, station identification circuit and station register, the former two in schematic form.

The trunk T does, however, include individually or in common with other trunks apparatus and circuit arrangements which, at any desired period during the extension of the connection, may be operated to determine identity of the calling station, each trunk being further provided with a station register comprising a group of storage relays in which the identity of the station may be stored for the purpose of this invention. In Fig. 2, the station identification equipment which, as said before, may be individual to the trunk or accessible to each of a plurality of trunks through suitable lock-out connectors, is conventionally indicated by the box SI, with controlled leads extending therefrom to the two conductors T and R for connection therewith when the station identification test is to be made. The storage register, which is part of the trunk and which, in the present embodiment of the invention, is limited to four relays, are shown and designated as relays A, B, C and D, which are selectively operated by the station identification circuit SI when the latter tests the line to determine which station is calling.

The station identification circuit SI may, for example, be of the kind shown in Patent No. 2,306,173 issued to M. A. Logan on December 22, 1942. When the circuit shown in this patent, or any other suitable circuit, is connected to the tip T and ring R conductors of the trunk TR, it operates to determine which of the four stations in the line L has initiated the call. As a consequence of this test, one of the register relays A, B, C or D corresponding to the calling station is operated in the station register and locked to register the identity of the station. Since it has been assumed that station B is the calling station, a circuit path will be completed for relay B by the station identification circuit SI, causing said relay to operate and lock to any suitable control ground.

While I have disclosed a telephone system including a line having four stations thereon with suitable apparatus indicated for determining the identity of each of the four stations when calling, my invention, the purpose of which is to determine the directory number of a calling station, is not limited to four stations or less stations on a line but may include lines having more than four stations, the example herein given being merely to illustrate the operation of the invention.

When the line extending operations have progressed to the point when the directory number of the calling station is to be determined, which will be after the station identification circuit SI has identified the calling station and the appropriate relay of the storage register—relay B if station B is calling—has been operated and locked, the equipment (not shown) controlling the extension of the connection will close a circuit for relay ST by any suitable means, such as, for example, a "control" relay, as shown. It will be observed that negative battery through relay ST is connected to condenser C1 of the control circuit and that the opposite terminal of this condenser is connected to the grid of vacuum tube V1 to the plate of which positive battery +B1 is permanently applied through resistor R2. The vacuum tube V1 is normally inactivated due to the application of negative potential to the grid of the tube by negative battery —B2 through resistor R1. When, however, relay ST operates, ground through the contacts of the control relay is applied to the winding of relay ST and to one side of condenser C1, causing the grid of the tube V1 to acquire a positive potential over the charging circuit completed through said condenser C1, resistor R1 and negative battery —B2. The potential at the grid is, of course, at maximum positive potential at the instant that the circuit is closed and, depending on the time constant of the network comprising the capacity of the condenser C1 and the ohmic value of resistor R1 would but for circuit action to be described later diminish in value as the condenser is charged, again acquire a negative value determined by the value of negative battery —B2 when the condenser is fully charged, which value would deactivate the tube V1. From the instant, therefore, that the grid of the tube V1 acquires maximum positive potential to the time it acquires cut-off negative potential, the tube operates to produce a sharp pulse of current through the circuit extending from ground on the cathode, anode of said tube, resistor R2 to positive battery +B1.

It will be observed that while tube V1 is in the deactivated state, tube V2 (which is a triode that may be enclosed within the same envelope as the triode of tube V1) is normally activated since its grid is permanently connected to positive battery +B1 through resistor R3. The grid, however, is practically at ground potential, due to the fact that the ohmic resistance of resistor R3 is made very large in comparison with the grid-to-cathode resistance of the tube. Current, therefore, flows from ground through the cathode of tube V2, anode of said tube, resistor R9 to positive battery +B1.

It will be further noted that tubes V4, V5 and V8 are also normally activated for the same reason that tube V2 is activated. That is, the anode battery +B1 is permanently connected over conductor 1 to the grids of said tubes via their respective resistors R4, R5 and R3 and causes said tubes to pass current over obvious circuit paths.

At this point it should be noted that, because of the conductivity of tube V2 and the flow of current through its circuit, the potential at the anode thereof is reduced and is, of course, less than the positive potential of the battery +B1 by the drop through resistor R9 the value of which is computed to produce a relatively low potential at the anode. Now when the control relay completes the circuit of relay ST as above described, and thereby applies ground to condenser C1, positive potential causes the grid of tube V1 to rise instantaneoulsy to maximum positive potential (or ground). As a consequence, tube V1 is rendered conducting over a circuit which extends from ground through the cathode and anode of tube V1, resistor R2 to positive battery +B1. Because of the conductive state of tube V1 and the drop in potential at the anode thereof due to the resistor R2, the grid of tube V2 which, as previously described, is normally conducting, is also instantaneously driven below its cut-off potential, causing said tube to become non-conducting. However, because of the flow of current in the circuit of tube V1, condenser C2 begins to discharge over a circuit from the lower terminal of resistor R2, through condenser C2, resistor R3 to positive battery +B1, and the time taken to discharge said condenser will depend, of course, upon its capacity and the ohmic value of resistor R3. It is obvious that as the condenser C2 discharges towards positive battery +B1, the potential on the grid of tube V2 gradually rises towards ground, the time at which it will again reach conducting value and thereby again render the tube V2 conductive depending upon the time constant of the circuit which includes condenser C2 and resistor R3. In the present embodiment of the invention the ohmic value of resistor R3 is made very high and the capacity of condenser C2 is so computed that the time taken for the grid of tube V2 to acquire conducting potential again will be in the order of 10 milliseconds. It will also be noted that during the time that tube V2 is in the non-conducting state, positive battery +B1 available at the lower terminal of resistor R9, is applied through condenser C3, which is very large, back to the grid of tube V1. It should be noted that a very large resistance may be used in place of condenser C3 to provide a better recovery time in the event of an immediate "retrial" as described hereinafter. Since this potential is positive and tube V1 was initially rendered conducting by the impulse of potential applied from condenser C1, the effect of applying positive potential to the grid of tube V1 through condenser C3 is to maintain a positive potential on the grid of the tube for the period that it will take tube V2 again to become conducting, which, as said before, is in the order of 10 milliseconds.

Vacuum tubes V9 and V10, as well as the tubes V11 and V12 perform an amplification function the object of which is to amplify the square wave of potential acquired at the anode of tube V2 during the 10-milliseconds period, to a potential appropriate to those functions of the circuit which depend upon the application of this amplified potential over conductor SL1, as subsequently described. Therefore during the time that tube V2 is in the non-conducting state, which is to say, during the time when positive potential from battery +B1 through resistor R9 is available at the anode of tube V2, said potential is applied to the grid of tube V9 through condenser C4. It should be noted that tube V9 is normally non-conducting due to the fact that its grid is at negative potential through resistor R10. Consequently, the positive potential applied to the grid of tube V1 has the effect of raising the potential of the grid of tube V9 beyond its conducting point, as a sequence of which tube V9 is rendered conducting over a circuit from negative battery —B2, through the cathode and anode of the tube, resistor R11, to positive battery +B1.

It will be observed that tube V10 is normally conducting, owing to the fact that its cathode and grid are both at the same potential. Therefore when tube V9 is rendered conducting, as above described, the potential at the anode of this tube is rendered less positive than the positive battery voltage +B1 by the value of the voltage drop through resistor R11. This voltage is applied through condenser C5 to the grid of tube V10 and immediately causes said grid to acquire a negative potential, the duration of which is controlled by the time constant determined by the value of condenser C5 and resistor R12. However, in view of the fact that the nonconductivity of tube V10 is to be maintained for the 10-milliseconds duration of the square-wave pulse, the capacity of condenser C5 and the ohmic resistance of resistor R12 are so computed that, by the end of this pulse, condenser C5 is still only charged to a very small extent. During the 10-milliseconds interval of the pulse, when tube V10 is non-conducting, positive potential from the battery +B1 is available at the anode of tube V10 through resistor R13. This positive potential is applied in parallel to the grids of tubes V11 and V12 through condenser C6. Normally both tubes V11 and V12 are cut off, owing to the fact that negative battery —B3 is applied to their respective grids through resistor R14. Therefore when tube V10 is rendered non-conductive as above described, and positive potential is applied to the grids of both tubes V11 and V12, the latter are rendered conducting. The effect of their conductivity is to draw current through the tubes and the common resistor R15, thereby raising the potential at the upper terminal of the resistor to the required value for application to conductor SL1 during the 10-milliseconds interval for which the tubes V11 and V12 will continue to conduct. It is evident, therefore, that for an interval of 10 milliseconds, a square-wave pulse is applied over conductor SL1, the effect of which results in the performance of certain functions which will be described later. It should be noted that, if needed, a shaping network may be used in the output.

It will be recalled that tubes V4, V6 and V8 are normally conducting. At the beginning of the 10-milliseconds interval when tube V1 is conducting, the potential available at resistor R1 to maintain tube V1 conducting during this interval is also applied, through condensers C7 and C8, to the grids of tubes V3 and V5, respectively. Since these tubes are normally nonconducting because negative battery —B2 is connected through individual resistors to their respective grids, the application of positive potential to said grids will cause the tubes to conduct. It will be observed, however, that the pair of tubes V3 and V4 and also the pair of tubes V5 and V6 are identical in their circuit elements and arrangements with the pair of tubes V1 and V2, except for the fact that resistance R4 and condenser C9 for the pair of tubes V3 and V4, and resistor R6 and condenser C10 for the pair of tubes V5 and V6, have different constants, in that said constants are of higher value to make the duration of the pulse emitted by the pair of tubes V3 and V4 and applied to conductor PTY, and that of the pulse emitted by tubes V5 and V6 and applied to conductor PX, somewhat longer than 10 milliseconds. For example and as indicated in Fig. 7, the pulse which is applied to conductor PTY at the output of tube V4 is somewhat longer than that of the pulse applied to conductor SL1, while the pulse available on conductor PX connected to the output of tube V6 is somewhat longer than that of the pulse applied to conductor SL1 and shorter than that which is applied to conductor PTY. The relative durations of these pulses are controlled, as said before, by the time constant of the RC circuit including condenser C9 and resistor R4 for the pair of tubes V3 and V4 and the RC circuit including condenser C10 and resistor R6 for the pair of tubes V5 and V6. By reference to Fig. 7 and for the present embodiment of the invention, the duration of the pulse applied to conductor SL1 is of the order of 10 milliseconds, the duration of the pulse applied to conductor PX is of the order of 10.5 milliseconds, while the duration of the pulse applied to conductor PTY is of the order of 11.5 milliseconds.

When tube V5 is deactivated at the end of the pulse interval on conductor PX there is, of course, a rise in potential on its anode, which is connected to battery +B1 through resistor R16. Positive potential thus available at the anode of tube V5 is applied to the grid of tube V7 which is normally cut off by the connection of negative battery B2 to its grid and normally kept from becoming conductive during the conductivity of tube V5 by condenser C11. It should be observed that when tube V5 is non-conducting, condenser C11 is given a negative charge which adds to the voltage of battery —B2 to maintain tube V7 in its non-conducting state. However when, at the end of the pulse period, tube V5 is rendered non-conducting, condenser C11 is given a positive step which overcomes the biasing effect of battery —B2 and drives the grid of tube V7 positive, thereby causing said tube to become conducting at the instant that tube V5 is made non-conducting. The drop in potential at the anode of tube V7 is felt at the grid of tube V8 which is immediately rendered non-conducting, the duration of which non-conductivity is determined by the time constant of the RC network comprising condenser C12 and resistor R8. During the time that tube V8 is thus in a non-conducting state, a positive pulse is applied to conductor Rd the duration of which is, of course, again controlled by the constants of condenser C12 and resistor R8. In the present embodiment of the invention, the length of the pulse applied to conductor Rd is approximately the difference between the duration of the pulse on conductor PTY and the duration of the pulse on conductor PX, as indicated in Fig. 7.

Returning, now, to the pulse applied to conductor SL1, and remembering that the calling line has been extended to the trunk TR, to the conductor S of which conductor SL1 of the control circuit is joined by any suitable means such as operated relay SL as indicated, the pulse is transmitted over the sleeve S of connection train to the sleeve terminal of the line and there applied through suitable cross-connections, such as the cross-connecting block CB, to the firing anode of each of the four tubes *Va*, *Vb*, *Vc* and *Vd*, each of which, it will be recalled, is individual to a station on the calling line, the association between each tube and its appropriate station being indicated by the subscript of the tube designation, which corresponds to the designation of the station.

Referring now to Fig. 1, it will be noted that seven groups of bus bars are shown, of which the first group, designated Party, consists of four bus bars and the next group, designated Office, consists of ten bus bars 0 to 9. The next four groups, namely, the Thousands, Hundreds, Tens and Units, each contain ten bus bars 0 to 9 also, while the Class of Service group contains as many bus bars as there are classes of service to which the different stations in the office may be severally entitled. Although in the present embodiment of the invention the number of bus bars in the Party group is indicated as four because the operation of the invention is being described with a representative line having four stations thereon, the number of such bus bars will, of course, be increased to coincide with the maximum number of stations that may be connected to any line of the telephone system, provided that suitable station identification for said number of stations is provided by the station identification circuit SI, indicated in Fig. 2.

Each of the tubes *Va*, *Vb*, *Vc* and *Vd* is, as before stated, individual to one of the four stations upon the line L, and each of them includes a cathode and a number of similar anodes, one of which is used for control or firing purposes. These tubes (as well as other tubes for other stations) are gas-filled tubes and a characteristic of each of said tubes is that if a firing potential is applied to any one of the anodes the tubes will ionize, and that if, thereafter, a "transfer" voltage is applied to another anode, or anodes, which is somewhat less than the firing voltage, the tube will remain ionized if the firing voltage is removed from the control anode. However, if the circuit is so arranged that the transfer voltage applied to one tube is also applied to the anode of another tube which was not previously ionized by the application thereto of breakdown voltage to one of its anodes, said last-mentioned tube will not be ionized by the transfer voltage.

In the present embodiment of the invention, the number of anodes in each of the tubes *Va*, *Vb*, *Vc* and *Vd* is limited to two more than the number of indications which are necessary for the identification of the directory number, class and originating office. These anodes are selectively connected to the different groups of the bus bars (except the Party bus bars) in accordance with the numerical value of the digit assigned to the office of origin, the numerical value of each of the digits of the directory number of the station, the location of the station on the line and the digital indication of the class of service. Thus, for example, considering station B at which the call is assumed to have been initiated, one of the anodes of tube *Vb* is connected to the bus bar B of Party group of bus bars. Further, station B is asumed to have the directory number 0692. Therefore, one anode of tube *Vb* will be connected to the No. "0" bus bar in the Thousands group, one anode will be connected to the No. "6" bus bar in the Hundreds group, one anode will be connected to the No. "9" bus bar in the Tens group and one anode will be connected to the No. "2" bus bar in the Units group. If we further assume that the office of origin is given an arbitrary designation of "zero," another anode will be connected to the No. "0" bus bar of the Office group, while if it is assumed that the class of service to which the calling station is entitled is given an arbitrary designation of "1," which might possibly mean that the station is not entitled to make calls beyond a certain zone, another anode will be connected to the No. "1" bus bar in the Class of Service group. Similar connections are made from the anodes of each of the tubes V- for each of the stations in the office to the bus bars in the several groups of bus bars. Owing to the manner in which the tubes *Va*, *Vb*, *Vc* and *Vd* are shown in Fig. 1, the connections above indicated are not shown except for the Class of Service and Party bus-bar groups, though such connections should be obvious from the disclosure.

In the case of a single station on a line, said station may be so connected to the line as to present no ground on the tip conductor T when the station initiates a call. Consequently when the station identification circuit SI operates, the absence of ground on the tip conductor T will cause it to operate one of the four relays of the station register, say relay A for example, which, therefore, by its operation, not only indicates one of the four party stations on a line, but also an individual station where one station only is connected to the line. With this arrangement, the anodes of the several tubes V- for the individual line stations which are reserved for connection to the Party group of bus bars would be connected to the A bus bar.

Each bus bar of the Party group is extended to the armature of its associated relay in each station register, one of which, as said before, is provided in each trunk TR. Hence when a relay in the station register is operated by the station identification circuit SI, the bus bar connected to the armature of said relay is electrically joined to conductor PTY of the control circuit.

Each bus bar in each of the bus-bar groups other than the Party group is connected to the grid of a vacuum tube of the detecting circuit shown in Fig. 3, and the anode of the latter is connected to an encoding network and thence to the control grids of two screen grid thyratron tubes. The anodes of the latter tubes are severally extended to the windings of two magnets of a suitable recording device.

Thus, for example (and as shown in Fig. 3), the

"0" bus bar of the Office group is extended by way of conductor 2 within bracket 3, to the grid of vacuum tube V20. The anode of tube V20 is then extended by way of two resistors in the encoding network to the grids of the two tubes V30 . . . V34 the anodes of which are respectively connected to two magnets PM of a recording device RD. In a like manner, each of the other bus bars of the Office, Thousands, Hundreds, Tens, Units and Class of Service bus-bar groups are likewise extended to the grids of vacuum tubes similar to vacuum tube V20, while the anodes of said tubes are each severally extended through the encoding networks to the grids of a pair of tubes similar to V30 . . . V34, the anodes of the latter tubes being severally connected to the windings of the recording magnets PM.

At this point it should be stated that in the present embodiment of the invention the identification of the directory number of the calling station as well as the office of origin and class of service, is to be recorded in the well-known two-out-of-five combination code by means of two-out-of-five perforations for each digit made on a suitable medium M by the perforating magnets PM of a perforator RD. A perforator of this type is disclosed in the copending application of W. W. Carpenter and J. W. Gooderham, Serial No. 724,992, filed June 29, 1947. As will be subsequently described, the operation of the system with respect to the identification of the various items of information results in the conductivity of all the tubes V20 in each of the bus-bar groups except the tube in each group which indicates an identified digit. The non-operation of this tube in each group could, of course, be utilized to record the digit on a decimal basis, but since it is desired that each of the digits be recorded in the two-out-of-five combination code, it becomes necessary to provide facilities for translating the decimal indication into the equivalent code indication. For this purpose, there is provided a group of five tubes for each bus-bar group, of which tubes V30 and V30' will be two. The anodes of the five tubes are then selectively wired to a group of five magnets PM reserved in the recording device RD to correspond to the information from that group of bus bars with which the magnets are permanently associated. Thus in Fig. 3, tube V20 is connected to the "0" bus bar of the Office group, thereby indicating a "0" value for the office digit. The tubes V30 and V34 of the group of five such tubes associated with all the tubes V20 of the Office group are connected to the two magnets PM of the group of five magnets reserved for the office digit which, when operated, will perforate in appropriate positions in the recording medium M two holes which indicate "0" in the two-out-of-five code. In a like manner, each of the other tubes V20 of each bus bar group will have their anodes selectively connected to those two tubes in the group of five tubes V30 . . . V34 reserved for said bus bar group, which will indicate in the two-out-of-five code the digital value of the bus bar to which the tube V20 is connected. Tubes V30 and V34, when rendered conducting, will operate their associated magnets PM to perforate in the two-out-of-five code and in appropriate positions on the recording medium M the specific value of the digit which their operation indicates.

It is obvious that the number of register tubes provided for each group of tubes V20 will depend upon the code used, and it is further obvious that if the various digits are to be recorded in decimal values, the circuit arrangement may be easily revised to cause the magnets PM to be operated directly from the tubes V20, thus omitting the group of five register tubes V30 . . . V34 for each group of bus bars.

In the present embodiment of the invention, the magnets PM of the recorder RD are operated directly from the register tubes V30 and V30' when the latter are activated, as would be the case in which the recorder RD is located in the office of origin. But where the recorder is located in another office and access to said recorder is obtained over a trunk, the identified information stored in the operated register tubes V30 and V30' may be converted by well-known means into signals of any suitable character for transmission over the trunk to set the magnets of the distant recorder.

Returning, now, to the pulse applied to conductor S by the control circuit, and remembering that as a result of the identification of station B which originated the call relay B was locked in the station register of trunk TR, the application of the pulse to conductor S causes tubes Va, Vb, Vc and Ve to become conducting, inasmuch as negative battery is permanently connected to the cathodes of each of these tubes. Since relay B is locked, the pulse on conductor PTY (which is applied to conductor PTY at the same time the pulse is applied to conductor SL1 and, therefore, to conductor S, as before described) is applied through the contacts of relay B and over conductor 4 to the bus bar "B" of the Party group of bus bars. Since bus bar B is connected to an anode of tube Vb, the pulse on conductor PTY will cause "transfer" action to take place in tube Vb, as a consequence of which the ionization of said tube will be maintained after the pulse on the conductor S will have terminated, which pulse, as previously noted and as indicated in Fig. 7, is of 10-milliseconds duration and shorter than the pulse on the conductor PTY. The result is that when the pulse on the conductor S is terminated, firing potential will be removed from the firing anodes of all four tubes Va, Vb, Vc and Vd, but because transfer potential is maintained in tube Vb at the time that firing potential is removed from it as well as tubes Va, Vc and Vd by the termination of the pulse on conductor S, it follows that while tubes Va, Vc and Vd become deactivated tube Vb will remain ionized as a result of the pulse condition maintained on conductor PTY after the pulse condition on conductors is terminated. It should be remembered that the transfer in tube Vb simply means that electrical activity has been transferred to that anode of tube Vb which is connected to the bus bar B of the Party group. The other anodes of tube Vb will have transfer activity imposed upon them only if transfer voltage is then, or at any other time thereafter, applied to said anodes while the tube is still in the activated state.

Referring to Fig. 7, it will be observed that for some interval of time prior to the termination of the pulse on conductor PTY but after the pulse is removed from conductor SL1, a pulse is applied to conductor Rd, which pulse terminates coincidentally with the pulse on conductor PTY. The difference in the time between the termination of the pulse on conductor SL1 and the time that the pulse is applied to conductor Rd is sufficient to insure the deactivation of tubes Va, Vc and Vd, during which interval, as previously described, tube Vb is being maintained in its ionized state by the pulse on conductor PTY.

The pulse on conductor Rd is transmitted over a conductor which connects to the extension of all the bus bars shown or indicated in Fig. 3 (that is, all the bus-bar groups except the Party group) and terminates at the common terminal of resistors R17 and R18, there being one resistor R17 for each bus bar and one common resistor R18 for all resistors R17. It will be noted that the upper terminal of resistor R17 is connected to the grid of its associated tube V20 while the lower terminal of resistor R18 is connected to negative battery —B4, which is a bias both on the multianode tube "read" anodes attached thereto as well as to the grids of all tubes V20. Now inasmuch as tube Vb is the only tube ionized at this time, and since the potential of the pulse on conductor Rd is applied to the extension of all of the bus bars in Fig. 3 and is of a value equal to the transfer voltage applied over conductor PTY to tube Vb, the pulse on conductor Rd will cause transfer activity to take place with respect to the remaining anodes of tube Vb, since these anodes (except the firing anode) are all connected to the extensions by way of the bus bars to which they are selectively connected at the terminals shown in Fig. 1 in accordance with the directory number of station B, the office indication and the class of service. All of the bus bars in the different bus-bar groups which are not connected to the anodes of the ionized tube Vb will not be conducting and, therefore, there will be no voltage drop across resistors R17 individual to each of these bus bars. However, since one bus bar in each group is connected to the ionized tube Vb, and since this bus bar will be conducting, there will be a voltage drop across its associated resistor R17.

It is thus seen that all detecting tubes (that is, the tubes V20 severally connected to the bus bars) will have full transfer voltage applied to their respective control grids via conductor Rd. Normally this will cause all the tubes V20 to become conducting except the one tube in each group of bus bars whose grid is connected to a bus bar made conducting by the transfer action at the anodes of tube Vb. These bus bars draw current through their associated resistors R17, causing a voltage drop in said resistor that reduces the potential at the grid of tube V20 to which it is connected, to a negative value and thereby causing the tube to remain non-conducting. The result is that, in each group of bus bars, all of the detecting tubes V20 will be rendered conducting except the one in each group which is individual to a particular digit in the directory number assigned to the calling station, including the office and class of service digits. Thus it has been assumed that the directory number of the calling station B is 0692, that the office digit is "0" and that the class of service digit is "1." Referring to Fig. 3 and particularly to tube V20 which is individual to the "0" value of the office digit, the pulse on conductor Rd is applied by way of the individual resistors R17 to all the ten bus bars of the Office group as well as to all other bus bars in all the other groups except the Party group. Since tube Vb is conducting, and because the anodes of this tube are severally connected to the No. "0" bus bar in the Office group, the No. "0" bus bar in the Thousands group, the No. "6" bus bar in the Hundreds group, the No. "9" bus bar in the Tens group, the No. "2" bus bar in the Units group and the No. "1" bus bar in the Class of Service group, the mentioned bus bar in each group will be conducting due to the fact that tube Vb is ionized, but the others will not. Since the pulse on conductor Rd is applied to all bus bars by way of their individual resistors R17, the potential of the pulse will, of course, be applied to the grids of the associated tube V20 connected to the bus bars. In the case of the bus bars which are not conducting the positive potential of the pulse, being equal to the transfer voltage, will have the effect of raising the potential of the grid of the associated tubes V20 to above cut-off, normally maintained thereon by negative battery —B4 through resistors R17 and R18, and causing said tube to become conducting. But in the case of a bus bar which is conducting (that is, a bus bar connected to an anode of tube Vb) such as, for instance, bus bar No. "0" of the Office group, the conductivity of the bus bar will cause current to flow over a circuit from lead Rd, through resistor R17, the bus bar and through the office anode and cathode of tube Vb. The result is that by the application of the pulse on conductor Rd to the grids of all the detecting tubes in the Office group of bus bars, all of the tubes will be rendered conducting except tube V20, which is the tube individual to the "0" digital value of the office digit. And it follows that since the pulse on conductor Rd is applied in a like manner to the bus bars of all the other groups, all the tubes V20 in each of said groups will be rendered conducting except the one in each group which indicates the digit to be recorded.

In view of the fact that one detecting tube in each group of bus bars remains non-conducting, the anode of each of said tubes remains at positive potential. However, since the anode of each of the indicating tubes is connected to the grids of two register tubes, as shown, for example, by tubes V30 and V34 which are associated with detecting tubes V20 (the other tubes not being shown) it follows that the control grids of those pairs of register tubes V30 . . . V34 which are connected to the anode of a detecting tube that remains non-conducting in each of the bus-bar groups will be enabled; that is, their control grids will be rendered somewhat more positive. The encoding register tubes (V30 . . . V34, etc.), however, are screen grid thyratron tubes and will not be rendered conducting in spite of the enabling potential until a suitable potential is applied to the screen grid thereof, as later described.

It will be observed from the wiring connections of the detecting tube V20 in Fig. 3 that a conductor 5 is connected from its anode to an anode of tube V40 in Fig. 4. There is a similar conductor 5 extending from the anode of each of the other tubes V20 . . . V20 (not shown) connected to the Office bus-bar group, and these other conductors are similarly connected to the anodes of tube V40. In a like manner, the anodes of the detecting tubes in each bus-bar group (except the Party group) are extended to the anodes of a tube, similar to tube V40 which is individual to the group. These latter tubes together with their associated circuit elements are not shown but are indicated in Fig. 4, which shows the detailed elements and wiring connections therefor with respect to tube V40 of the office group bus bars and indicates in block diagram, each with an appropriate legend, the remaining five networks.

Tube V40 is identical in characteristics to any of the station tubes Va, Vb, Vc, etc., and for the purposes of the present embodiment of the invention it will be assumed to have ten anodes, as will also be true with the tubes of the remaining networks except that, if desired, the tube V40 assigned for the class of service, may have less anodes if the number of classes of service are less than ten.

As previously described, the result of the application of the pulse on conductor Rd was to cause all the detecting tubes in each of the busbar groups to be rendered conducting except the one tube in each group indicating the digit in that group to be recorded. The anode of each non-conducting tube remains at positive battery potential (as previously noted), which positive potential is not only effective in enabling two of the associated register tubes V30 . . . V34 (for the non-conducting tube V20 of the Office group of bus bars) but is also effective in operating tube V40 associated with all of the detecting tubes V20 of the office bus bar group, by causing the positive voltage on the non-conducting tube to be applied to an anode thereof. In a like manner, each non-conducting detecting tube V20 in each of the remaining bus-bar groups similarly causes the associated tube V40 in the checking network correlated with that bus-bar group to be rendered conducting. Tube V40 in each of the checking networks is thus rendered conducting. Confining our attention to the detailed circuit network of tube V40 for the Office group of bus bars as shown in Fig. 4 (it being understood that the operations now to be described also apply to the other five networks indicated in Fig. 4), the conductivity of tube V40 results in a circuit being established which extends from negative battery, through resistor R19 the cathode and anode of tube V40 to which positive potential has been applied by way of conductor 5 as above described. Current is thereby caused to flow through said circuit, resulting in the establishment of a potential higher than negative battery at the upper terminal of resistor R19 which is applied to the grid of vacuum tube V50 through resistor R20 and, also, to the grid of vacuum tube V50′ through resistor R21. Normally, both tubes V50 and V50′ are non-conducting, due to the fact that when tube V40 is normal, negative potential is applied to their respective grids over obvious paths. However, when tube V40 is rendered conducting as above described and a positive potential is applied to the grid of both tubes V50 and V50′, the voltage drop across resistor R19 is sufficient to overcome the bias on the cathode of tube V50′ but insufficient to overcome the bias on the cathode of tube V50, the reason being that the cathode of tube 50 is normally biased by the adjustment of its connection to resistor R23 of the potentiometer comprising resistors R22, R23, and R24, to a negative potential which is higher in value than the potential that will be applied to its grid when tube 40 is rendered conducting, while the cathode of tube 50′ is normally biased by the adjustment of its connection to resistor R24 to have a less negative potential. The result is that if, as assumed, only one anode in tube V40 has had high positive potential applied to it, the current drawn through the tube, and consequently through resistor R19, will be sufficient to cause conduction of tube V50′ but not of tube V50.

Tube V60 is normally conducting, its grid being connected to a network consisting of resistors R25, R26 and R27, the first of which is of relatively low value. Resistors R26 and R27 are computed to be of such value that, under normal conditions, the potential available at their midpoint is at the same or slightly higher value than the negative voltage applied to the cathode of the tube. Since, therefore, tube V60 is normally conducting, then when tube V50′ conducts in response to the operation of tube V40, the lower than positive potential available at the anode of tube V50′ will cause cut-off potential to be applied at the grid of tube V60. As a consequence, tube V60 will cease to conduct, at which time the higher positive potential then available at the anode thereof is applied to resistor R28 which feeds back to the grid of tube V60′. Since this latter tube is normally non-conducting because of the value of voltage appearing at the junction of resistors R28 and R29, the application of positive potential from the anode of V60 will cause the grid of tube V60′ to become zero or better and thereby cause said latter tube to conduct so that, upon the conductivity of tube V50′, a potential lower than positive battery +B1 will be applied to conductor OPT.

It will be understood of course (as said before) that a similar action will take place in each of the other check circuits indicated in Fig. 4, the effect of which is to cause the application of less than +B1 voltage to each of the corresponding conductors OPT associated with each of said other check circuits.

The above operations are based on the supposition that in the application of the pulse over conductor Rd, one detecting tube V20 will remain non-conducting in each group of tubes associated with each group of bus bars.

It will now be assumed that, because of some trouble condition or other condition, more than one detecting tube in one or more of the several groups of bus bars are left non-conducting. If we assume, for example, that this condition prevails in the Office group of bus bars and that two tubes V20 are left non-conducting in the group, the positive potential available at the anode of said two tubes will be applied to the anodes of tube V40 to which they are connected by way of their respective conductors 5. As a result of this condition, tube V40 will, of course, be ionized, as it was in the previously described operation. But since, in the present case, there are two conducting paths from the two anodes instead of one, the quantity of current drawn through resistor R19 will be almost twice what it was before, and the potential available at the upper terminal of resistor R19 will then be sufficient to cause positive potential to be applied to the grid of tube V50 as well as to the grid of tube V50′. In other words, if tube V40 is rendered conducting as a consequence of the application of potential to only one of its anodes, tube V50′ only will operate, but if tube V40 is rendered conductive by more than on anode having potential applied thereto, then both tubes V50 and V50′ will be rendered conducting. As a result of the operation of tube V50, a potential will be applied to resistor R28 to the left of the dividing point thereof, and recalling that high potential is also applied to the right of the dividing point of this resistor in consequence of the operation of tubes V50′ and V60, the divider is adjusted to a point where, when both tubes V50 and V50′ operate, the potential to the left of the divider offsets the high potential to the right and does not raise the voltage on the grid of tube V60′.

The result of this is that the condition of tube V60' remains undisturbed inasmuch as nothing occurs to change the potential normally applied at the grid thereof, which potential is sufficiently negative to hold the tube in a normally non-conducting state.

Thus to recapitulate the operation of the group of check circuits indicated in Fig. 4, and of which only one is shown: when the detecting tubes V20 of the electronic network shown in Fig. 3 are operating normally as a result of the application of the pulse on conductor R*d* to resistors R17, to cause one tube V20 in each group to remain non-conducting, the check circuit for the particular group of bus bars in which such a condition occurs will operate as previously described to cause a lower than positive potential to be applied to its associated conductor OPT. But when the detecting tubes are not functioning normally, in that none or more than one tube in each group of bus bars is left in the non-conducting state, the associated check circuit in Fig. 4 will then operate as previously described to cause full battery voltage +B1 to be applied to its associated conductor OPT.

Referring now, to Fig. 5, it will be noted that the six conductors OPT from the six groups of check circuits shown in Fig. 4 are connected to the six anodes of tube V70 which is similar in characteristics to the station tubes V*a*, V*b*, etc. and tube V40. If the operation of the six separate check circuits is correct, in that an indication is given over each conductor OPT that one detecting tube, and one only, is operated for each group of bus bars, then in each of the six conductors OPT there will be less than full battery potential +B1 and this potential is applied to the anodes of tube V70. But this potential, although applied to each of the anodes of the tube, will not cause the tube to break down.

When the pulse is applied to conductor R*d*, said pulse is also applied to the grid of tube V71. Now tubes V71 and V71' and the circuit interconnecting them are similar to tubes V1 and V2 and the latters' circuit arrangement in Fig. 6, and they function in the same manner except that the time constant determined by the value of condenser C13 and the value of resistor R30 is so computed as to cause a delay in the application of a positive trigger pulse over conductor 6 connecting with the grid of tube V72 and grid of tube V74. At this point it should be noted that the bias on the grid of tube V74 is lower than than that applied to the grid of tube V72 by virtue of the fact that resistor R31 is computed to produce a lower bias on the grid of this tube than that produced by resistor R32 on the grid of tube V72. Therefore when tubes V71 and V71' operate to produce a pulse which is applied to the grids of both tubes V72 and V74, tube V72 will be rendered conducting while tube V74 will not be.

Tubes V72 and V72' are amplifier tubes which function in the normal manner to cause the application of an amplified positive pulse to conductor OK, which is connected to the screen grids of all of the register tubes V30 . . . V34 associated with each group of detecting tubes V20. Remembering that some two tubes V30 . . . V34 are connected to each detecting tube V20, and remembering, further, that the pair of such tubes connected to each detecting tube V20 which was left non-conducting were enabled, the pulse on conductor OK renders the screen grid of said enabled tubes positive, causing them to operate and complete circuits through their associated printer magnets PM. As a result, a pair of perforator magnets PM operates for each group of bus bars to record in the two-out-of-five code on the medium M the digit indicated by the bus bar connected to the grid of the detecting tube V20 which was left in a non-conducting state, which tube, in turn, indicates the particular digital value of the digit to be indicated by its associated group of bus bars.

In the event, however, that tube V70 operated because, in one or more of the groups of bus bars none or more than one of the detecting tubes V20 associated therewith remained unoperated, the current drawn through the circuit including resistor R33 will produce a voltage drop at the upper terminal of resistor R33 which is applied to the grid of tube V73 to match or overcome the normal bias on the cathode thereof, indicated by the divider between the ground and battery −B5. The consequent operation of tube V73 causes the grid of tube V73' to be rendered negative and since the latter tube is normally conducting, the application of negative potential to the grid thereof will cause it to cease to conduct. This negative potential is also applied to the grid of tube V72 over conductor 7, thereby increasing the bias on the grid of this tube so that, when the pulse which is normally effective to operate it in the manner previously described; that is, when no error is found in the number of detecting tubes V20 operated, the additional negative potential to increase the bias will cause the pulse on conductor 6 to be ineffective, thereby leaving tube V72 in the non-conducting state. The result is that no pulse will be applied to conductor OK the register tubes V30 . . . V34 will not be ionized and no printer magnets PM will be operated. On the other hand, the fact that tube V73' has been rendered non-conducting increases the potential on the anode thereof to the full positive value +B1, which reduces the normally high bias on the grid of tube V74. The result is that when the pulse on conductor 6 is effective on the conductor connecting with the grid of tube V74, said tube will be rendered conducting. Tubes V74 and V74' are straight amplifier tubes and the application of the pulse, as described, to the grid of tube V74 operates these tubes to produce a positive pulse which is applied to conductor NG connected to the grid of tube V1 in the control circuit. This pulse on conductor NG has the same effect on tube V1 as the pulse which originally initiated its operation by the application to its grid of ground from the control relay in Fig. 6, and will cause the circuit to make a "retrial" of the operations in an attempt to obtain a correct identification. The number of retrials which may be attempted is a matter of convenience. It can be eliminated entirely or it can be attempted a predetermined number of times by a suitable circuit control operating in response to the potential on conductor NG. Thus the pulse for operating the register tubes V30 . . . V34 for the purpose of recording the detected information is supplied by a check circuit after the latter has operated and determined that one detecting tube V20, and one only, was left non-conducting as a result of the detecting operations above described. It is apparent, however, that the check is not essential to the detecting or recording functions; that the checking circuit can be entirely eliminated, in which event conductor OK will be connected to conductor R*d* to cause the operation of the register tubes V30 and V30' by the pulse on said conductor.

Fig. 1A shows a slight modification of the invention for the purposes of adapting it to identifying the directory number of a P. B. X group or other line groups, the individual lines of which may have or may not have individual identifying numbers and yet, for accounting or other purposes, it is necessary to record the account number to which all calls in the group are to be charged. Considering the circuit shown in Fig. 1A, it will be observed that the P. B. X group is assumed to comprise a plurality of lines AN, X, Y, each involving, by way of example, a station on each line, and each including therefor a tube VAN, V*x* and V*y*, respectively which is similar to each of the station tubes V*a*, V*b*, etc. as shown in Fig. 1. The distinction, however, lies in the fact that for the lines of the P. B. X group the sleeve conductors S connected to the firing anode of the individual line tubes are further severally cross-connected to the anodes of a collector tube COL, there being one such anode in tube COL for each line in the P. B. X group. The cathode of the collector tube COL is connected to the control anode of the vacuum tube AMP, the main anode of which is connected through resistor R36 to conductor PX. Bridged across the control anode and cathode of the tube AMP is a very high resistance R35. The output of the circuit of tube AMP is taken off its cathode and, through an appropriate network, is applied to the "Party" anode of the line tube of the P. B. X group to which the directory number for the group is assigned, as, for example, and as indicated in Fig. 1A, tube VAN of the first line AN having the directory number "1000." The other anodes of each of the line tubes are, of course, connected to the Thousands, Hundreds, Tens, Units, Office and Class of Service bus-bar groups in accordance with their individual directory numbers, if any as in the case of the station on line L.

Thus the distinction between the arrangement for P. B. X groups and the arrangement for stations on lines, as indicated in Figs. 1 and 1A, lies simply in the fact that, while the tubes of the individual stations on a line are normally connected to the bus bars in the manner indicated in Fig. 1, in the case of the lines of the P. B. X group, the party anodes of the line tubes are not connected to any Party bus bars. The tube in the P. B. X group to which the directory number of the group is assigned has its "Party" anode connected to the cathode of tube AMP of that P. B. X group.

If, now, it is assumed that a call is initiated from one of the lines of the P. B. X group, for example line X other than the one to which the P. B. X directory number is assigned, that is, line AN, the extension of the call will be made in the manner previously described up to and including the time when the pulse is applied to the conductor S of the connection from the control circuit. Since the sleeve conductors S in the P. B. X group are connected to the anodes of the collector tube COL, the application of a pulse to the sleeve conductors will cause the simultaneous breakdown of the tube individual to the line X that initiated the call and the collector tube COL, since the latter is connected by resistors R35 and R34 to negative battery.

Referring to Fig. 7, it will be noted, and as previously described in connection with the operation of the control circuit shown in Fig. 6, that at the time a pulse is applied to conductor SL1, another pulse of a longer duration is applied to conductor PX which, as before stated, is connected to the main anode of the tube AMP; and it will be further recalled in connection with the description of the operation of the control circuit that the pulse on conductor PX persists for some time after the termination of the pulse on the sleeve conductor SL1, although both pulses are applied to their different conductors simultaneously. Consequently when the pulse on the conductor SL1 is applied to the conductor S to break down the line tube V as well as the collector tube COL, the presence of positive potential on conductor PX will cause transfer to take place in tube AMP from its control anode to its main anode, in consequence of which current will be drawn from negative battery through resistor R34, the space of the tube, resistor R36, to positive potential on conductor PX. Potential available at the upper terminal of resistor R34 is now applied to the party anode of the tube VAN of the line in the P. B. X group to which the directory number has been assigned, causing said tube to break down and initiate operations previously described, whereby the circuits in Figs. 3, 4 and 5 operate to cause the recording of the directory number 1000 of the P. B. X group.

It will be observed that the party anode of the line in the P. B. X group to which is assigned the directory number is connected to the network composed of resistors R37 and R38 and condenser C14 located in the output conductor from tube AMP. The purpose of this network is to prevent any false operation of the tube AMP due to interference or noise induced in the conductor if it happens to be included in a cable which contains other conductors carrying signals or noise currents of different kinds.

The terms and expressions which I have employed are used as terms of description and not of limitation, and I have no intention, in the use of such terms and expressions, of excluding any equivalents of that shown and described or portions thereof, but recognize that various modifications are possible within the scope of the invention claimed.

What is claimed is:

1. In a telephone system, a line having a plurality of stations thereon each having an identifying designation, an electronic device for each station, means responsive to one of said stations when calling for momentarily and partially operating each of said electronic devices, means effective during the partial operation of said electronic devices for completing the operation of the particular one of said partially operated electronic devices which is individual to the calling station, and a recording device responsive to said wholly operated electronic device for recording the designation of said calling station.

2. In a telephone system, a line having a plurality of stations thereon each having an identifying designation, an electronic device for each station, means responsive to one of said stations when calling for momentarily and partially operating each of said electronic devices, means effective during the partial operation of said electronic devices for completing the operation of the particular one of said partially operated electronic devices which is individual to the calling station, a recording device, and means cooperatively effective with said completely operated electronic device after said partially operated electronic devices have restored for operating said recording device to record the designation of said calling station.

3. In a telephone system, a line having a plurality of stations thereon each having an identifying designation, an electronic device for each station, means responsive to one of said stations when calling for extending said line and for establishing a path from each of said electronic devices, means effective over said line as extended for momentarily and partially operating each of said electronic devices, means effective over the established path from the electronic device individual to the calling station for completing the operation of said latter device during the partial operation of all of said electronic devices, and a recording device responsive to said wholly operated electronic device for recording the designation of said calling station.

4. In a telephone system, a telephone station having an identifying designation comprising one or more digits or characters, an electronic device for said station having a cathode and one more electrode than the number of digits or characters in said designation, indicating means, means for establishing an electric current between the cathode and one of said anodes, and means thereafter effective for establishing an electric current between the remainder of said anodes and said indicating means, thereby to cause said latter means to indicate the digits or characters of the designation of said station.

5. In a telephone system, a telephone station having an identifying designation, an electronic device for said station having a cathode and a plurality of anodes, an electronic network selectively connected to some of said electrodes in accordance with the designation of said station, means for establishing an electric current between a free electrode and the cathode of said electronic device, and means thereafter effective for establishing electric currents over said connected electrodes and said electronic network, thereby to operate said electronic network to indicate the designation of said station.

6. In a telephone system, a telephone station having an identifying designation, an electronic device for said station having a cathode and a plurality of anodes, an electronic network selectively connected to some of said electrodes in accordance with the designation of said station expressed in a predetermined code, means for establishing an electric current between a free electrode and the cathode of said electronic device, and means thereafter effective for establishing electric currents over said connected electrodes and said electronic network, thereby to operate said electronic network to indicate the designation of said station according to said predetermined code.

7. In a telephone system, a telephone station having an identifying designation, an electronic device for said station having a cathode and a plurality of anodes, an electronic network selectively connected to some of said electrodes in accordance with the designation of said station, means for establishing an electric current between a free electrode and the cathode of said electronic device, means thereafter effective for establishing electric currents over said connected electrodes thereby to operate said electronic network, and a recording device responsive to the operation of said electronic network for recording the designation of said station.

8. In a telephone system, a line with a plurality of stations thereon, each of said stations having an identifying designation, an electronic device for each of said stations having a cathode and a plurality of anodes, an electronic network selectively connected to some of the anodes of each of said electronic devices in accordance with the designation of the station individual to each of said devices, means responsive to the extension of said line when one of said stations calls for establishing an electric current between a free electrode and the cathode of each of said electronic devices, and means thereafter effective for establishing electric currents over the connected electrodes of the electronic device belonging to the calling station only, thereby to operate said electronic network to indicate the designation of said calling station.

9. In a telephone system, a line having a plurality of stations thereon, each of said stations having an identifying designation, an electronic device for each of said stations having a cathode and a plurality of anodes, an electronic network selectively connected to some of the anodes in each of said electronic devices in accordance with a predetermined code expressing the designation of the station individual to each one of said devices, means responsive to the extension of said line when one of said stations calls for establishing an electric current between a free electrode and the cathode of each of said electronic devices, and means thereafter effective for establishing electric currents over the connected electrodes of the electronic device individual to the calling station only, thereby to operate said electronic network to indicate the designation of said calling station in said predetermined code.

10. In a telephone system, a line having a plurality of stations thereon, each of said stations having an identifying designation, an electronic device for each of said stations having a cathode and a plurality of anodes, an electronic network selectively connected to some of the anodes in each of said electronic devices in accordance with the designation of the station individual to each one of said devices, means responsive to the extension of said line when one of said stations calls for establishing an electric current between a free electrode and the cathode of each of said electronic devices, means thereafter effective for establishing electric currents over the connected electrodes of the electronic device individual to the calling station only thereby to operate said electronic network, and a recording device responsive to the operation of said electronic network for recording the designation of said calling station.

11. In a telephone system, a line having a plurality of stations thereon each having an identifying designation, an electronic device for each of said stations having a cathode, an electrode connected to said line and a plurality of other electrodes, an electronic network connected to certain ones of said plurality of other electrodes in each of said electronic devices in accordance with the designation of the station individual to each of said devices, a register having connections to another electrode of said plurality of electrodes in each of said electronic devices, means responsive to one of said stations when calling for operating said register to register therein the identity of said calling station, means for establishing an electric current between the cathode of each of said electronic devices and the electrode of each of said devices connected to said line, and means thereafter effective over the connection between said register and the electrode of the device pertaining to said calling station for establishing electric currents between the electrodes of said latter device and said electronic network, thereby to operate said electronic network to indicate the designation of said calling station.

12. In a telephone system, a line having a plurality of stations thereon each having an identifying designation, an electronic device for each of said stations having a cathode, an electrode connected to said line and a plurality of other electrodes, an electronic network connected to certain ones of said plurality of other electrodes in each of said electronic devices in accordance with the designation of the station individual to each one of said devices, a register having connections to another electrode of said plurality of other electrodes in each of said electronic devices in accordance with the identity of each of said stations, means responsive to one of said stations when calling for operating said register to register therein the identity of said calling station, means for establishing an electric current between the cathode of each one of said electronic devices and the electrode of each one of said devices connected to said line, means thereafter effective over the connection between said register and the electrode of the electronic device individual to said calling station for establishing electric currents between the electrodes of said latter device and said electronic network, thereby to operate said electronic network in accordance with the designation of said calling device, and a recording device comprising a plurality of magnets selectively responsive to the operation of said electronic network for recording the identity of said calling station.

13. In a telephone system, a line having a plurality of stations thereon each having an identifying designation, an electronic device for each of said stations having a cathode, an electrode connected to said line and a plurality of other electrodes, an electronic network connected to certain ones of said plurality of other electrodes in each of said electronic devices in accordance with the designation of the station individual to each one of said electronic devices expressed in a predetermined code, a register having connections to another electrode of said plurality of other electrodes in each of said electronic devices in accordance with the identity of each of said stations, means responsive to one of said stations when calling for operating said register to register therein the identity of said calling station, means for establishing an electric current between the cathode of each of said electronic devices and the electrode of each of said devices connected to said line, means thereafter effective over the connection between said register and the electrode of the electronic device individual to said calling station for establishing electric currents between the electrodes of said latter device and said electronic network, thereby to operate said electronic network in accordance with the designation of said calling station, and a recording device comprising a plurality of magnets selectively responsive to the operation of said electronic network for recording the identity of said calling station in accordance with said predetermined code.

14. A telephone system according to claim 10, in which said electronic network comprises an electronic device connected to each one of said other electrodes, a pair of vacuum tubes for each one of said electronic devices, and connections between each of said pairs of vacuum tubes and the magnets of said recording device in accordance with said predetermined code.

15. In a telephone system, a line having a plurality of stations thereon each having an identifying designation comprising a plurality of digits or characters, a first electronic device for each of said stations having a cathode, an electrode connected to said line and a plurality of other electrodes equal in number to one more than the digits or characters in each of said designations, an electronic network comprising a plurality of other electrodes except one in each of said first electronic devices, a register having a connection to the remaining electrode in each of said first electronic devices in accordance with the identity of each of said stations, means responsive to one of said stations when calling for operating said register to register therein the identity of said calling station, means for establishing an electric current between the cathode of each of said first electronic devices and the electrode thereof connected to said line, means thereafter effective over the connection between said register and the electrode of the first electronic device individual to said calling station for establishing conductive paths over its other electrodes whereby certain of said second electronic devices in said electronic network are rendered conductive, and means simultaneously effective for rendering all of said other second electronic devices conductive and for suppressing the conductivity of those of said second electronic devices previously rendered conductive, whereby the non-conductivity of said latter second electronic devices operates its associated pair of vacuum tubes to indicate the digits or characters of the designation of the calling station.

16. A telephone system according to claim 12 wherein each tube in each of said pairs of vacuum tubes includes a screen grid electrode normally maintained at a potential to suppress the conductivity of the tube, a control electrode connected to its associated second electronic device, and means for increasing the potential of all of said vacuum tubes after certain ones of said second electronic devices have been rendered non-conducting, whereby the control grid in each tube of said pair of vacuum tubes connected to a non-conducting second electronic device primes the tube for operation and whereby said increase in potential on the screen grid electrode of said tube causes its operation.

17. In a telephone system, a line having a plurality of stations thereon each having an identifying designation, an electronic device for each of said stations having a cathode, an electrode connected to said line and a plurality of other electrodes, an electronic network selectively connected to certain ones of said plurality of other electrodes in each of said electronic devices in accordance with the designation of the station individual to an electronic device, a register having connections to another of said plurality of other electrodes in each of said electronic devices in accordance with the identity of the station individual to the device, means responsive to one of said stations when calling for operating said register to register therein the identity of said calling station, means for establishing an electric current between the cathode of each of said electronic devices and the respective electrode thereof connected to said line, means thereafter effective over the connection between said operated register and the electrode of the electronic device individual to said calling station for selectively operating said electronic network, means for checking the selective operation of said electronic network, and means responsive to the operation of said checking means for further operating said electronic network to indicate the designation of said calling station.

18. In a telephone system, a line having a plurality of stations thereon each having an identifying designation, an electronic device for each of said stations having a cathode, an electrode connected to said line and a plurality of other electrodes, an electronic network selectively connected to certain ones of said other electrodes in each of said electronic devices in accordance with the designation of each of said stations, a register having connections to another electrode in each of said stations, means responsive to one of said stations when calling for operating said register to register therein the identity of said calling station, means for establishing an electric current between the cathode of each of said electronic devices and the respective electrodes thereof connected to said line, means thereafter effective over the connection between said operated register and the electrode of the electronic device individual to said calling station for selectively operating said electronic network, means for checking the selective operation of said electronic network, and means responsive to said checking means failing to check the selective operation of said electronic network for reestablishing said electric current between the cathodes of said electronic devices and the respective electrodes thereof connected to said line and the current over said register between the electrode connected thereto and the electrodes of said electronic device individual to said station and said electronic network, thereby to repeat the cycle of operations.

19. In a telephone system, a plurality of lines each having a station thereon, one of said stations having an identifying designation, an electronic device for each of said stations having a cathode, an electrode connected to the line individual to the station and a plurality of other electrodes, another electronic device having a cathode and a plurality of electrodes, each of said electrodes being extended to one of said lines, still another electronic device having an electrode connected to the cathode of said other electronic device and another electrode connected to one of said plurality of electrodes in said electronic device individual to the station having an identifying designation, an electronic network selectively connected to other of said plurality of electrodes in said latter electronic device in accordance with the designation of said station, means for establishing an electric current between the cathode and anode of a tube individual to a station having no designation, whereby said second electronic device and said vacuum tube are thereby both rendered conducting, said vacuum tube thereby effecting the conductivity of the electronic device individual to the station having an identifying designation, and means thereafter effective for establishing conductivity between the electrodes of the electronic device individual to said latter station and said electronic network, thereby to operate said electronic network to indicate the designation of said latter station.

20. In a telephone system, a first station having an identifying designation, a plurality of other stations, a device for each of said stations including said first station, a recording device, means responsive to one of said plurality of stations when calling for operating the device individual to said calling station, means responsive to the operation of said device for operating the device individual to said first station, and means responsive to the operation of said latter device for operating said recording device to record the identifying designation of said first station.

21. In a telephone system a plurality of lines each having a station thereon, one of said stations having an identifying designation, an electronic device for each of said stations having a cathode, an electrode connected to the line individual to the station and a plurality of other electrodes, another electronic device having a cathode and a plurality of electrodes, each of said electrodes being extended to the line of the station, a vacuum tube having an electrode connected to the cathode of said other electronic device and another electrode connected to one of said plurality of electrodes in said electronic device individual to the station having an identifying designation, an electronic network selectively connected to other of said plurality of electrodes in said latter electronic device in accordance with the designation of said station expressed in a predetermined code, means for establishing an electric path between the cathode and anode of a tube individual to a station having no designation whereby said second electronic device and said vacuum tube are both rendered conducting, the latter tube thereby effecting the conductivity of the electronic device individual to the station having an identifying designation, means thereafter effective for establishing conductivity between the electrodes of the electronic device individual to said latter station and said electronic network, thereby to operate said electronic network, and a recording device responsive to the operation of said electronic network to record the designation of said latter station in said predetermined code.

22. In a telephone system a plurality of lines each having a station thereon, one of said stations having an identifying designation, an electronic device for each of said stations having a cathode, an electrode connected to the line individual to the station and a plurality of other electrodes, a second electronic device having a cathode and a plurality of electrodes, each of said electrodes being extended to the line of a station, a third electronic device having an electrode connected to the cathode of said second electronic device and another electrode connected to the one of said plurality of electrodes in said electronic device individual to the station having an identifying designation, an electronic network selectively connected to other of said plurality of electrodes in said latter electronic device in accordance with the designation of said station, means for establishing an electric path between the cathode and anode of a tube individual to a station having no designation, whereby said second electronic device and said third electronic device are both rendered conducting, said third electronic device thereby effecting the conductivity of the electronic device individual to the station having an identifying designation, means thereafter effective for establishing conductivity between the electrodes of the electronic device individual to said latter station and said electronic network, thereby to operate said electronic network, and a recording device responsive to the operation of said electronic network to record the designation of said latter station.

23. In a telephone system, a first station having an identifying designation, a plurality of other stations, a device for each of said stations, means responsive to one of said plurality of stations when calling for operating the device of said calling station, and means responsive to the operation of said device for operating the device individual to said first station.

RICHARD P. MURPHY.

REFERENCES CITED

The following references are of record in the file of this patent:

UNITED STATES PATENTS

| Number | Name | Date |
|---|---|---|
| 2,252,766 | Holden | Aug. 19, 1941 |
| 2,267,950 | Phodes | Dec. 30, 1941 |
| 2,270,246 | Bascon et al. | Jan. 20, 1941 |
| 2,299,513 | Taylor | Oct. 20, 1942 |
| 2,319,424 | Maloney | May 18, 1943 |
| 2,344,612 | Hartley | Mar. 21, 1944 |